(12) United States Patent
Zhou et al.

(10) Patent No.: US 8,295,346 B2
(45) Date of Patent: Oct. 23, 2012

(54) SMALL DETAIL RESERVATION IN CONTENT-ADAPTIVE QUANTIZATION

(75) Inventors: Zhi Zhou, Irvine, CA (US); Yeongtaeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 715 days.

(21) Appl. No.: 12/420,763

(22) Filed: Apr. 8, 2009

(65) Prior Publication Data

US 2010/0260257 A1   Oct. 14, 2010

(51) Int. Cl.
*H04N 7/12* (2006.01)
*H04N 11/02* (2006.01)
*H04N 11/04* (2006.01)
*G06K 9/36* (2006.01)
*G06K 9/00* (2006.01)
*H03M 7/00* (2006.01)

(52) U.S. Cl. ............... 375/240.03; 382/166; 341/61
(58) Field of Classification Search ........... 375/240.03
See application file for complete search history.

(56) References Cited

U.S. PATENT DOCUMENTS

| 5,341,442 A * | 8/1994 | Barrett ............... 382/166 |
| 7,791,508 B2 * | 9/2010 | Wegener ............. 341/61 |
| 2007/0237221 A1 * | 10/2007 | Hsu et al. ........... 375/240.03 |

\* cited by examiner

*Primary Examiner* — Behrooz Senfi
*Assistant Examiner* — Hee-Yong Kim

(57) ABSTRACT

Video processing systems and methods for preservation of small details in video undergoing quantization is discussed. Small details are preserved by identifying an area of interest within a video frame, determining whether small details are present within the selected portion of the video frame, and further determining whether those small details may be lost during quantization. In the event that small details are present in the selected portion of the video frame and may be lost during quantization, a color-shifting operation may be performed on one or more color components of the selected portion of the video frame, such as luminance, prior to quantization to preserve the small detail. During the color-shifting operation, the values of at least one color component of pixels representing the video frame are shifted such that the pixels extend between at least two quantization levels when quantized. In this manner, small detail is preserved, while also allowing for a reduction in the total bits of information contained in the video frame.

16 Claims, 8 Drawing Sheets

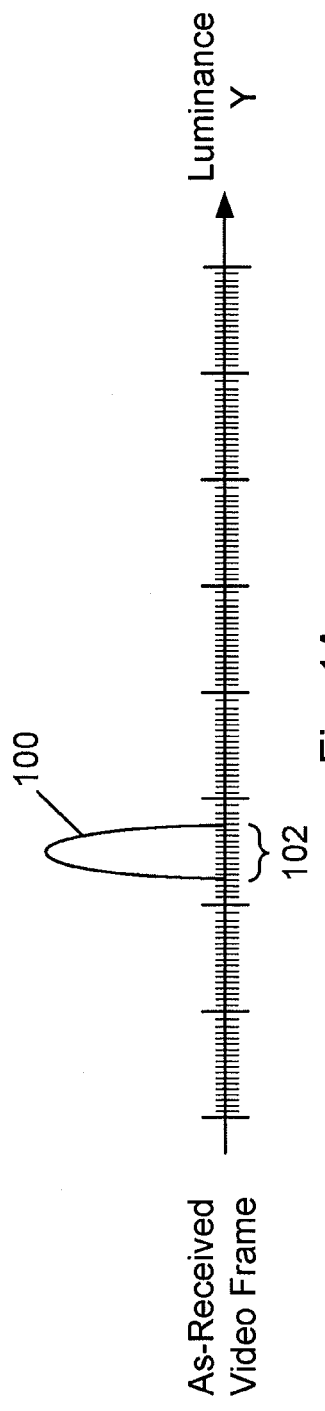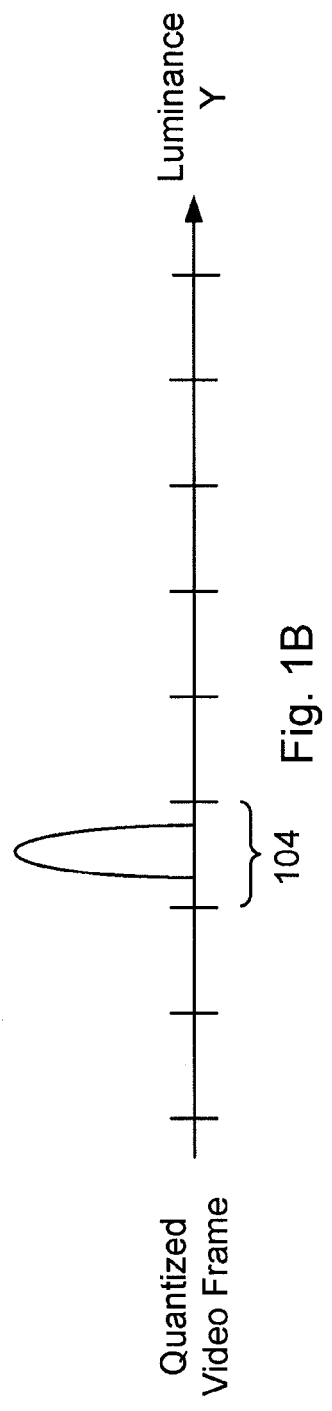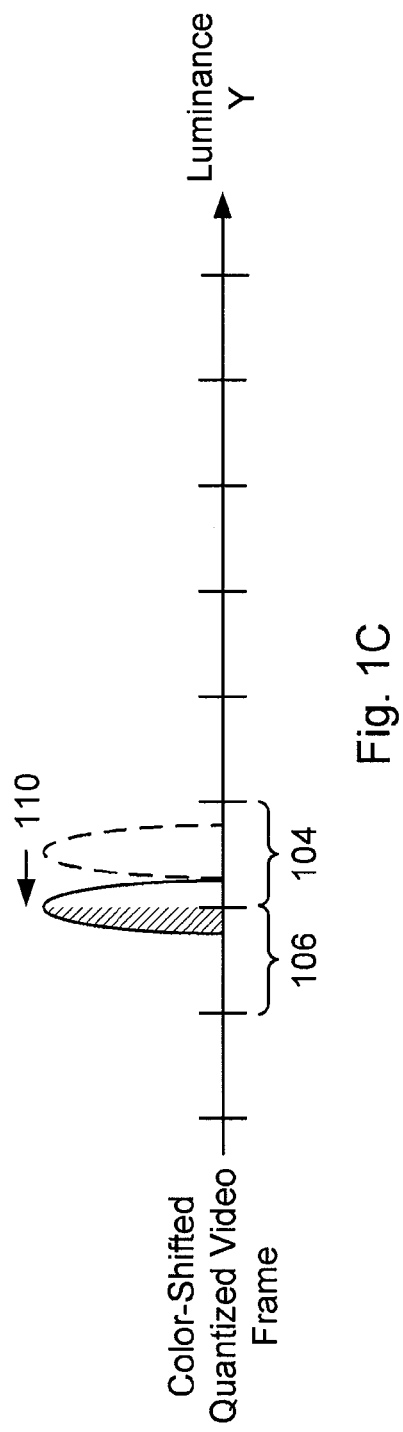

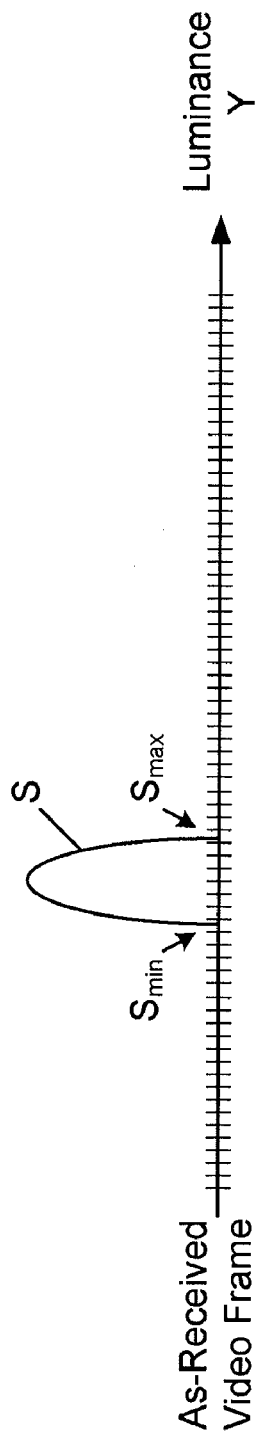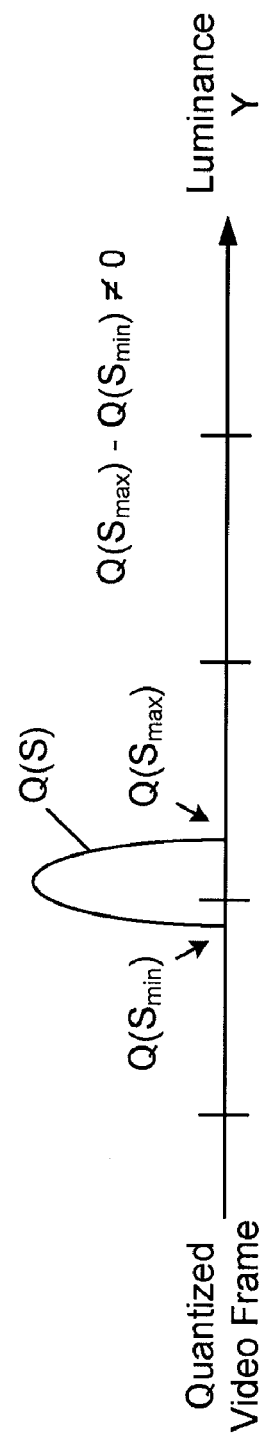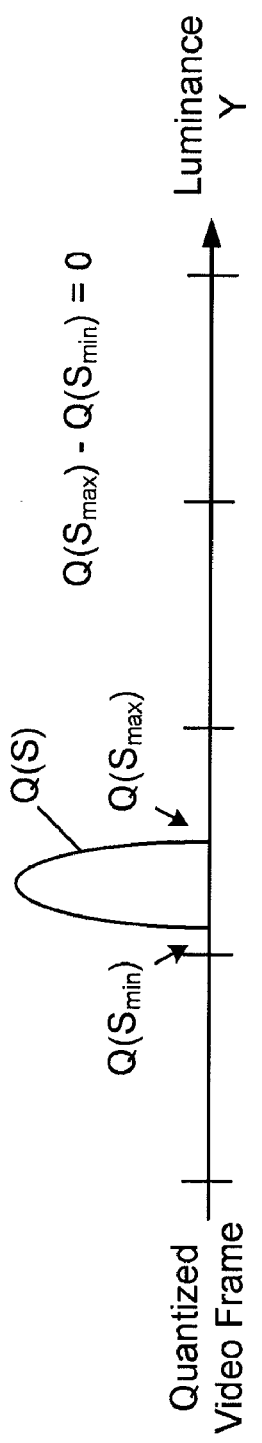

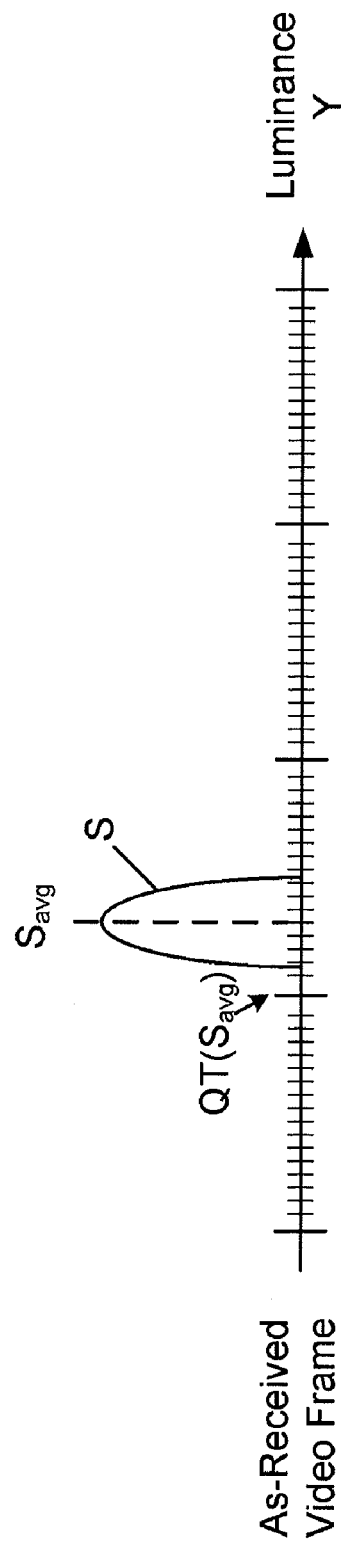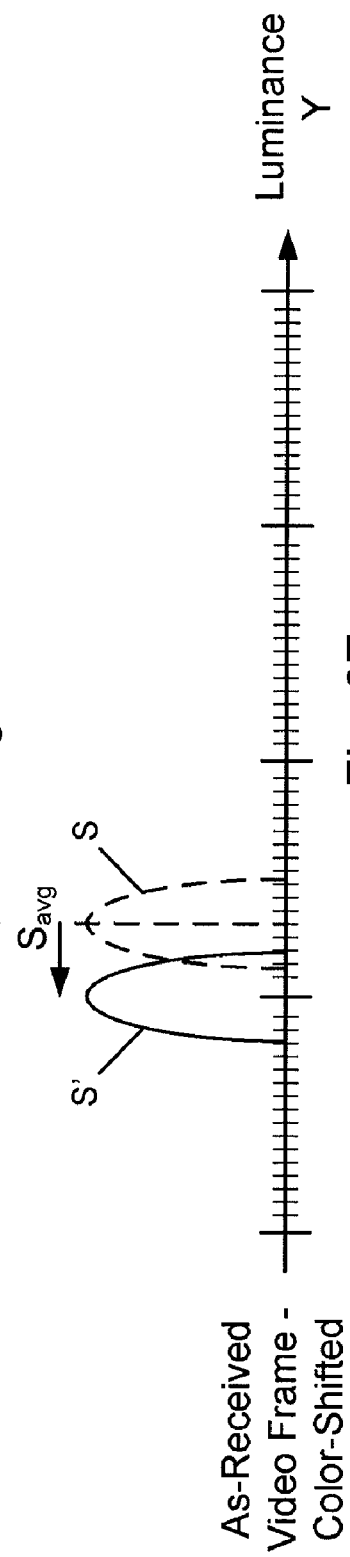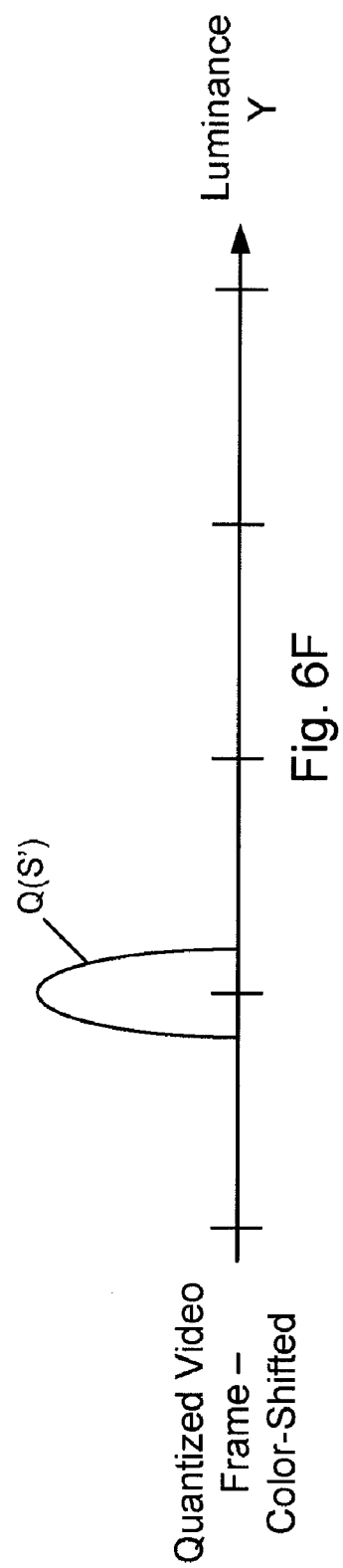

| | As-Received Luminance Values | |
|---|---|---|
| 33 | 38 | 36 |
| 39 | 32 | 35 |
| 37 | 37 | 36 |

Fig. 7A

| | Quantized Luminance Values | |
|---|---|---|
| 2 | 2 | 2 |
| 2 | 2 | 2 |
| 2 | 2 | 2 |

Fig. 7B

| | Shifted Luminance Values | |
|---|---|---|
| 29 | 34 | 32 |
| 35 | 28 | 31 |
| 33 | 33 | 32 |

Fig. 7C

| | Shifted, Quantized Luminance Values | |
|---|---|---|
| 1 | 2 | 2 |
| 2 | 1 | 1 |
| 2 | 2 | 2 |

Fig. 7D

SMALL DETAIL RESERVATION IN CONTENT-ADAPTIVE QUANTIZATION

BACKGROUND OF THE INVENTION

1. Field of the Invention

Embodiments of the present disclosure relate generally to systems and methods for video processing, in particular, to preservation of small detail through a content-adaptive quantization process.

2. Description of the Related Art

A video signal may be described in terms of a sequence of pictures, which include frames (an entire picture), or fields (e.g., an interlaced video stream comprises fields of alternating odd or even lines of a picture). A frame may be generally used to refer to a picture, a frame, or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×subblocks, and so forth. Depending on context, a block may refer to either a macroblock, a subblock, or even a single pixel.

Video sequences may be received by a receiving device in a compressed format and subsequently decompressed by a decoder in the receiving device. Video sequences may also be received in an uncompressed state. In either case, the video sequence may be characterized at least by a frame rate and a horizontal and vertical pixel resolution. Many times, a display device associated with the receiving device may require a different frame rate and/or pixel resolution and video reconstruction of one or more video frames may be performed.

Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing, and trans-coding are examples of processes where decoder devices create new video data based on already reconstructed video data. In addition, these motion compensation techniques can use encoded data, such as motion vectors and residual error, as well as the reconstructed video data for estimating the newly created frames.

In order to reduce the cost of processing video frames, motion estimation is typically performed on compressed images, where the number of bits contained in the compressed image are reduced, as compared with an uncompressed image. During motion estimation, certain lines of pixels are read in to memory and computations are applied on those lines to identify motion vectors. With fewer lines read, less memory is employed, and less complex computations are required for motion estimation, which reduces the processing cost.

Unfortunately, when images are reduced in bit number, big details are preserved but small details are often lost. As a result, portions of the frame which previously were distinguishable from one another become homogenized and indistinguishable. With this loss of detail, the quality of motion estimation is reduced, as detection of motion objects between frames becomes more difficult, and artifacts may be introduced into processed images.

SUMMARY

In an embodiment, a computer-implemented method of video processing is provided. The method comprises making a first determination whether small details are present within a selected portion of a video frame, wherein the video frame comprises a plurality of pixels having one or more color components. The method also comprises making a second determination whether quantization of the selected portion of the video frame will result in the loss of the small details. The method further comprises, if small details are determined to be present in the selected portion of the video frame and quantization of the selected portion of the video frame is determined to result in the loss of the small details: shifting values of at least one selected color component of the pixels by a selected amount; and quantizing the video frame. After quantization, the values of the selected color component of the pixels are present within at least two quantization levels, thereby preserving small details in the video frame.

In another embodiment, a content adaptive quantization system for video processing is provided. The system comprises a small detail analysis component which detects the presence of small details within a selected portion of a video frame, where the video frame is represented by a plurality of pixels having one or more color components. The system also comprises a shifting component that shifts the values of at least one selected color component by a selected amount. Upon quantization of the selected portion of the video frame, the selected color component values of the shifted pixels reside within at least two adjacent quantization levels, preserving at least a portion of the small detail within the quantized video frame.

In an additional embodiment, a video processing system, is provided. The system comprises a video compression component configured to receive a video signal representing at least one video frame. The video compression component is operative to: identify the presence of small details within a selected portion of a video frame, analyze the selected portion of the video frame to determine whether quantization of the selected portion of the video frame will result in the loss of the small details, and shift values of at least one color component of a plurality of pixels representing the video signal by a selected amount. After quantization, the values of the selected color component of the pixels are present within at least two quantization levels, thereby preserving small detail within the selected portion of the video frame. The system further comprises a motion estimation component configured to receive a quantized video signal comprising the shifted, quantized pixels from the video compression component so as to perform motion estimation upon motion objects within the video frame.

BRIEF DESCRIPTION OF THE DRAWINGS

FIGS. 1A-1C are luminance histograms illustrating an embodiment of a color-shifting quantization process for small detail preservation; (1A) luminance histogram of an as-received video frame; (1B) luminance histogram of an as-quantized video frame; (1C) luminance histogram of a color-shifted and quantized video frame;

FIGS. 6A-6F are luminance histograms of video signals illustrating embodiments of methods for color-shifted quantization for small detail preservation; (6A) luminance histogram of an as-received video frame illustrating luminance distribution, S, minimum luminance, $S_{min}$, and maximum luminance, $S_{max}$; (6B) luminance histogram of an as-quantized video frame illustrating quantized minimum luminance, $Q(S_{min})$, and quantized maximum luminance, $Q(S_{max})$ spanning multiple quantization levels; (6C) luminance histogram of an as-quantized video frame illustrating quantized minimum luminance, $Q(S_{min})$, and quantized maximum luminance, $Q(S_{max})$ residing within a single quantization level; (6D) luminance histogram of an as-received video frame illustrating average luminance, $S_{avg}$, and quantization threshold for average luminance, $Q(S_{avg})$; (6E) luminance histogram of an as-received video frame after color-shifting; (6F) luminance histogram of a color-shifted, quantized video frame; and FIGS. 7A-7D are luminance values of pixels in an example of an embodiment of the color-shifting process of the present disclosure; (7A) as-received luminance values; (7B) quantized luminance values; (7C) color-shifted luminance values; (7D) quantized, shifted luminance values.

DETAILED DESCRIPTION

Embodiments of the present disclosure present systems and methods for small detail preservation in video processing and, more particularly, small detail preservation in content-adaptive quantization. In certain embodiments, small details may refer to small texture of video content, where the edges demarking one feature of the video content from another are not strong. In brief, the small details are preserved through a first series of video processing operations including selecting an area of interest within a video frame, determining whether small details are present within the selected portion of the video frame, and determining whether those small details may be lost during quantization. In the event that small details are determined to be present in the selected portion of the video frame and a further determination is made that these small details may be lost by quantization, a color-shifting operation is performed prior to quantization in order to preserve the small detail.

In the color-shifting operation, at least one color component of a color space represented by the pixels of the selected portion of the video frame are shifted by a selected amount. This amount is selected such that the histogram of the selected color component extends between, or straddles, at least two quantization levels, when the video frame is quantized. In certain embodiments, the selected color space component may comprise luminance. However, in further embodiments, color-shifting may be performed using one or more other color space components in lieu of, or in addition to, luminance, without limit.

The benefits of this color-shifting operation may be observed in FIGS. 1A-1C. FIG. 1A illustrates a luminance histogram 100 of the pixels of a selected portion of an as-received video frame, extending over multiple luminance values 102. While luminance is shown for illustrative purposes, it may be understood that other color space components of the video frame may additionally or alternatively be employed.

FIG. 1B illustrates the luminance histogram 100 after quantization of the pixels. Notably, the histogram 100 is contained within a single quantized luminance value 104. The implication of this observation is that the small details previously represented within the pixels of selected portion of the video frame are lost.

Figure 2:
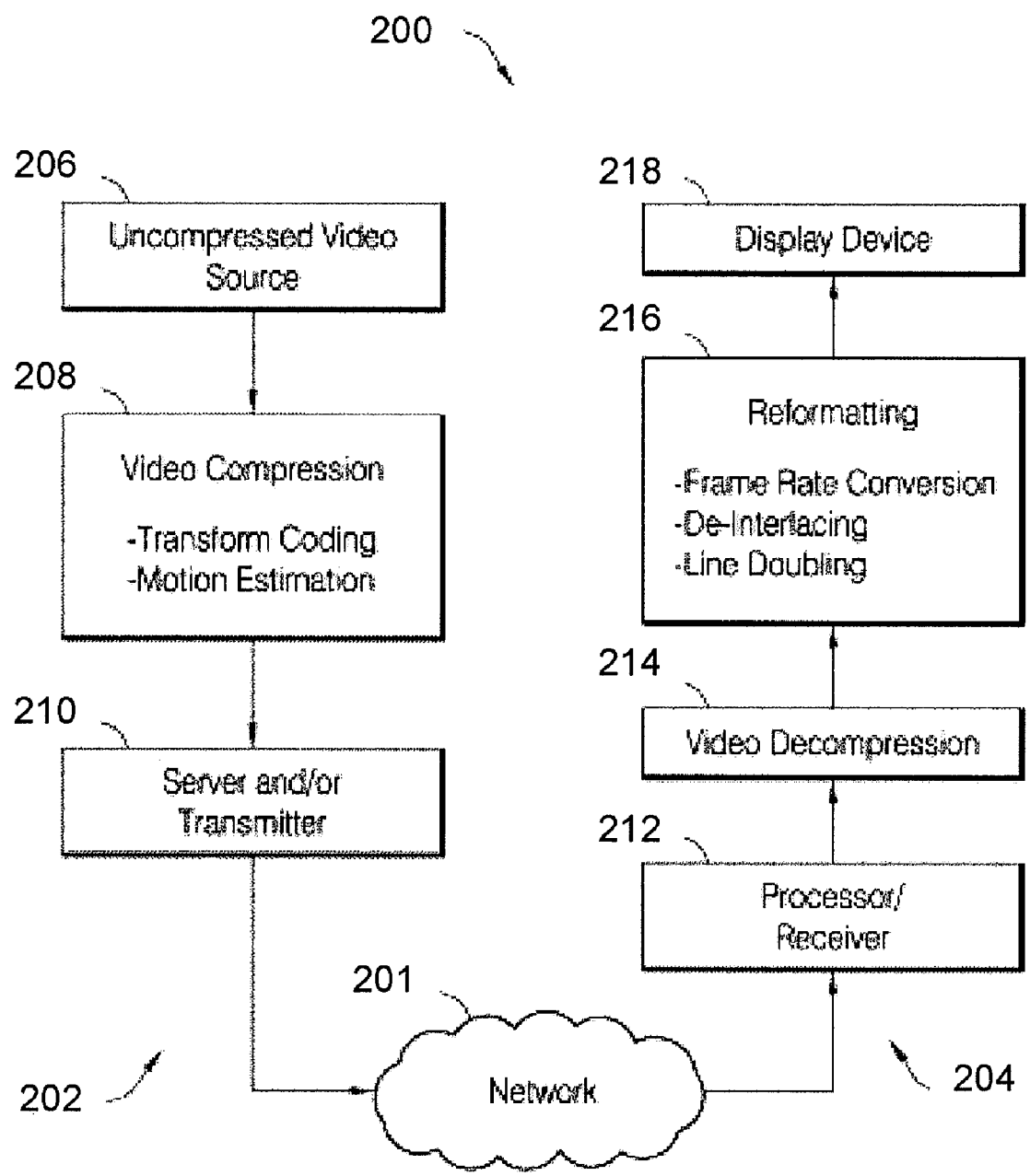
FIG. 2 is a block diagram of an embodiment of a video system capable of performing color-shifted quantization for small detail preservation.

By color-shifting the pixels, however, the position of the luminance histogram is moved (arrow 110) such that it extends between two quantization levels after quantization, such as quantization level 104 and an adjacent quantization level 106 (FIG. 1C). As a result, the pixels comprising the selected portion of the video frame adopt one of the two quantization values 104, 106, rather than just one quantization value 104. In this manner, small detail is preserved, while at the same time, allowing for a reduction in the total number of bits, which is beneficial for later motion estimation operations. These and other advantages of the present disclosure are discussed in detail below FIG. 2 illustrates a functional block diagram of an exemplary video system 200. The system 200 includes a video source 202 and video reception device 204. In this embodiment, the video source 202 obtains raw (uncompressed) video from an uncompressed video source 206, compresses it with a video compression element 208, and stores or communicates the compressed video data using a communication element 210. The video reception device 204 includes a processor and/or receiver 212, a video decompression element 214 and a reformatting subsystem 216. The compressed video can be communicated from the video source 202 to the video reception device 204 via a network 201.

The uncompressed video source 206 can be a video camera or a memory device, such as a disk drive. The uncompressed video source 206 may provide uncompressed video data in the form of luminance and chrominance, or in individual color intensities such as red, green and blue, etc.

The video compression element 208 performs any of various video encoding techniques to remove the redundancy from the uncompressed video data. Transform coding may be used to remove higher spatial frequency components thereby removing spatial redundancy within a frame. Most video compression schemes involve a form of motion estimation such as block matching/motion compensated prediction or optical flow as well as others. The purpose of the motion estimation schemes is to remove the temporal redundancy between frames in a video sequence. Other forms of video compression known to skilled technologists may also be used in the video compression element 208.

The communication element 210 may be a server that is connected to the Internet and stores the compressed video. The communication element 210 may also be a transmitter that is configured to transmit the compressed video over the network 201. The network 201 may comprise one or more of a wire line or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a DMB (Digital Multimedia Broadcasting) system, an orthogonal frequency division multiple access (OFDM) system, or a DVB-H (Digital Video Broadcasting-Handheld) system.

The processor/receiver 212 of the video reception device 104 receives the compressed video over the network 201. In another embodiment, the processor/receiver accesses the compressed video from a memory storage device such as a DVD, a hard drive, a memory card, etc. The processor/receiver 212 can be included in a personal computer, a set top box, a handheld device, etc.

The video decompression element 214 decodes (e.g., decompresses) the received compressed video data. The video decompression element 214 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 214 can be part of the same device that contains the processor/receiver 212, or it can be a separate device. The video reception device 204 can be part of a set-top box, a DVD player, a PC, etc. In some embodiments, the video reception device 204 may receive uncompressed video (e.g., from the uncompressed video source 206). In these embodiments, the video decompression element 214 may be omitted.

The format of the reconstructed video output from the video decompression element 214 may depend on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second, and PAL is 25 frames per second. The format may be interlaced or progressive. The reformatting subsystem 216 modifies the video signal to a format that fits the format of a display device 218 that is connected to the video reception device 204. The display device may be a television set (e.g., NTSC, PAL or HDTV), or a computer monitor running at frame rates such as 70 Hz, 75 Hz, 80 Hz, 120 Hz, etc. The reformatting subsystem 216 may be part of the same device as the video decompression element 214 and/or the processor receiver 212. In some embodiments as discussed above, the video received by the video reception device 204 may be uncompressed video (e.g., from the uncompressed video source 206) and the video decompression element 214 may be omitted. In these embodiments, the reformatting subsystem 216 may reformat the uncompressed video.

The processes performed by the reformatting subsystem 216 can be very similar to the encoding schemes used to encode the compressed video data. Motion estimation/compensation can be used to create intermediate frames between reconstructed frames in order to enable frame rate conversion. Therefore, methods of spatial prediction and temporal prediction used in encoder devices can also be used in decoder devices for purposes of reformatting the video. The reformatting subsystem 216 can use reconstructed video data and/or compressed video data (e.g., motion vectors, residual error values, etc.) for performing the reformatting.

Figure 3:
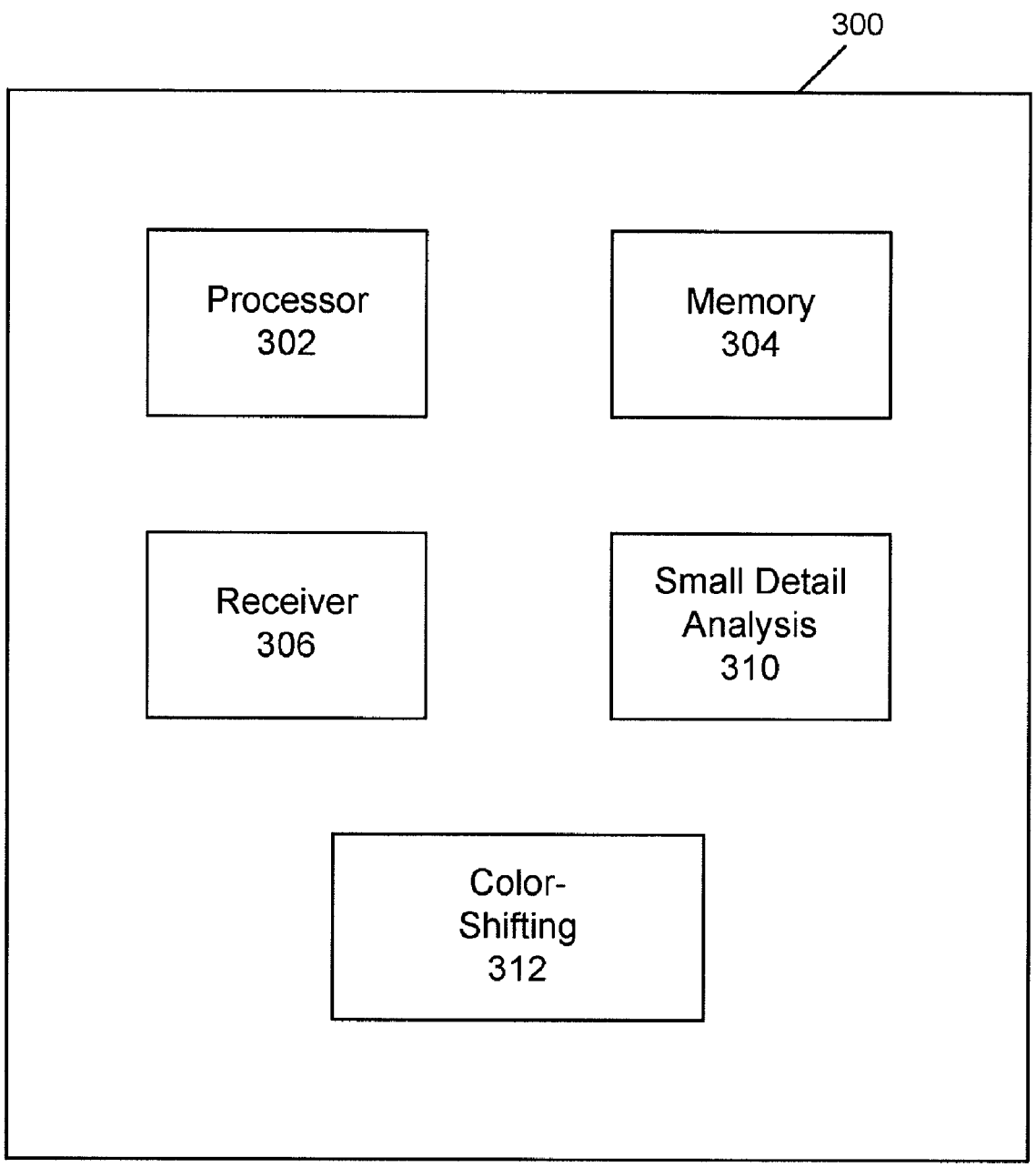
FIG. 3 is a block diagram of a content adaptive quantization system for performing color-shifting quantization.

FIG. 3 is a block diagram illustrating an embodiment of a quantization system 300. In certain embodiment, the quantization system 300 may be used as part of a video compression component of a video system such as illustrated in FIG. 2. The quantization system 300 may comprise a processor 302, a memory 304, a receiver 306, a small detail analysis component 310, and color-shifting and quantization component 312.

The processor 302 may include one or more of a general purpose processor, and/or a digital signal processor, and/or an application specific hardware processor. The memory 304 may include, for example, one or more of integrated circuits or disk based storage or any readable and writeable random access memory device. The processor 302 may be coupled to the memory 304 and the other elements to perform the various actions of the other elements. The receiver 306 may receive video data over the network 201. In other embodiments, the receiver 306 may be omitted and the video data may be retrieved from memory 304 or one or more external memory devices including, but not limited to, memory discs, memory cards, network accessible memory, etc. The video data may be received over the network 201, retrieved from the memory 304, or from external memory devices and may be compressed or uncompressed video data. In the case of compressed video data stored in the memory 304 or in the external memory devices, the compressed video data may have been created at an earlier time by an encoding device such as the video source 202 in FIG. 2.

It may be understood that one or more of the elements of the system 300 of FIG. 3 may be rearranged and/or combined. The elements may be implemented by hardware, software, firmware, middleware, microcode, or any combination thereof Details of the actions performed by the elements of the quantization system 300, and particularly the small detail analysis component 310 and color-shifting and quantization component 312 are discussed in greater detail below.

Figure 4:
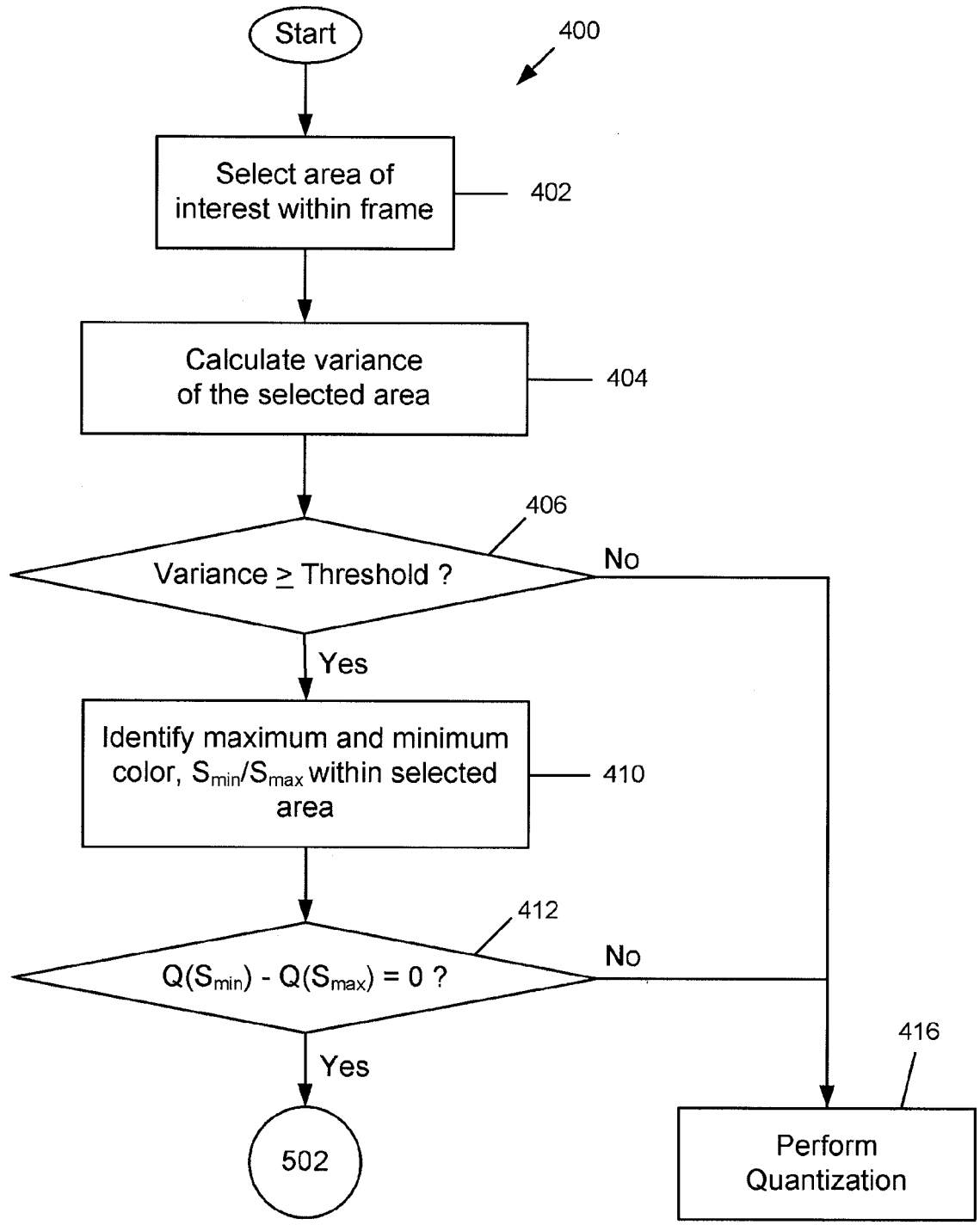
FIG. 4 is a flow diagram illustrating one embodiment of a method for identification of video frames containing small details to be subjected to color-shifted quantization for small detail preservation.
Figure 5:
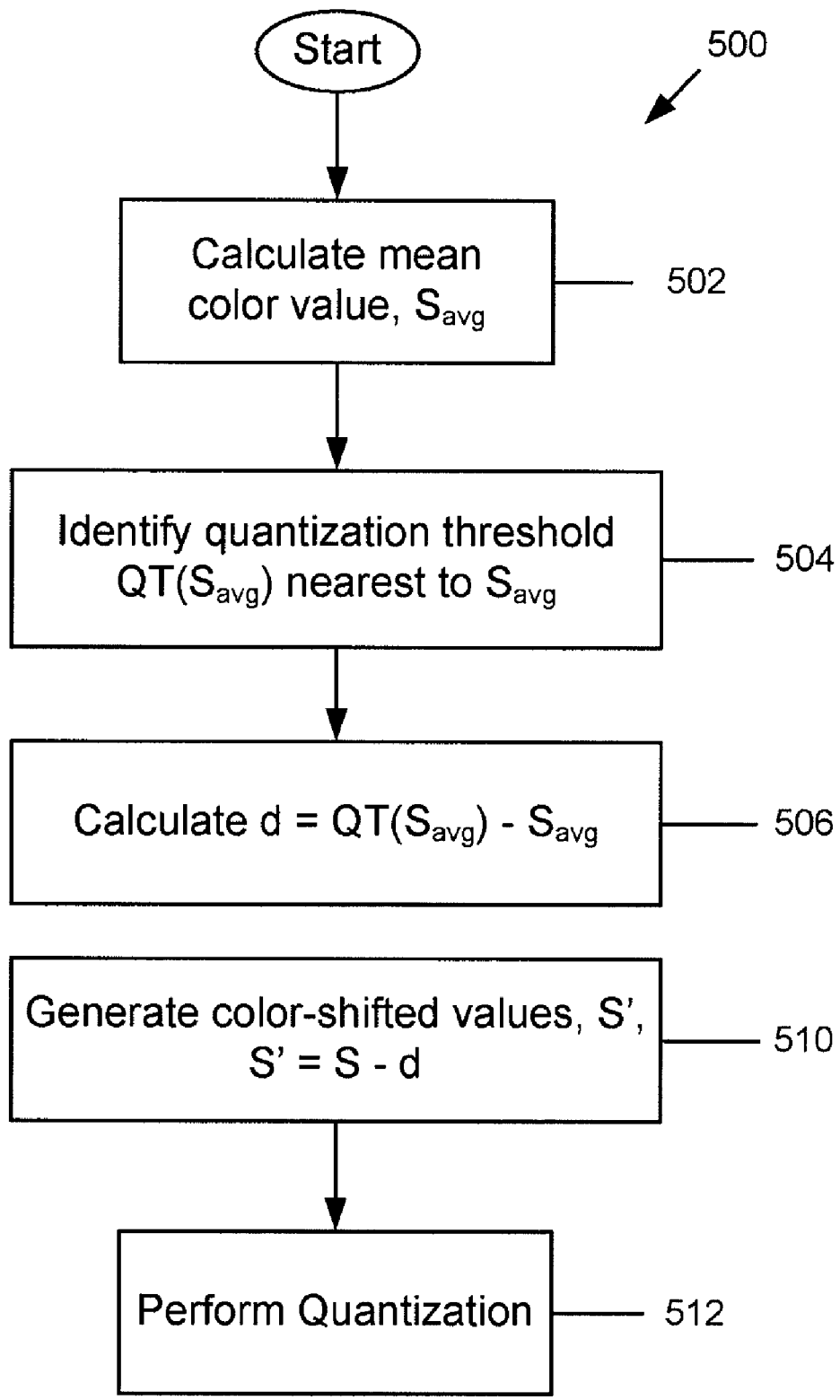
FIG. 5 is a flow diagram illustrating one embodiment of a method for color-shifted quantization for small detail preservation.

FIGS. 4 and 5 will now be discussed with reference to FIGS. 6A-6F. FIG. 4 is a flow diagram illustrating one embodiment of a method 400 for identification of small details within a selected area of a video frame which are to be subjected to color-shifting prior to quantization. In the embodiments of FIGS. 4-6, analysis and color-shifting are performed on the luminance component of the video frame. It may be understood that, in alternative embodiments, other color components, such as red (R), green (G), blue (B), U (blue-chrominance), V (red-chrominance), and combinations thereof, may be used in combination with, or in lieu of, luminance.

The method 400 begins in block 402 with selection of an area of interest within the video frame. Such an area may range in size between least a portion of the video frame up to substantially the entire video frame. Such a selection may be made by the small detail analysis component 310 or another component of the video system.

In blocks 404-406, a determination is made by the small detail analysis component 310 whether small details are present within the selected area. In one embodiment, this determination is made by comparison of a statistical measurement of the luminance values of the pixels contained within the selected area with a threshold value, T. The threshold may be selected or empirically determined by experiment.

Examples of the statistical measurement may include, but are not limited to, variance, standard deviation, and mean absolute deviation. In an embodiment, variance may be employed as the statistical measurement. The variance value of luminance is a measure of the statistical dispersion of the luminance, capturing the scale or degree to which the luminance is spread out, and may be calculated according to Equation 1:

$$\text{Var}(Y) = E[(Y-\mu)^2] \quad (1)$$

where Y is luminance, Var(Y) is the variance of luminance, and luminance has an expected value (mean) of $\mu = E(Y)$.

In the case where the variance is less than T, the small detail analysis component 310 determines that there is insufficient small detail to warrant color-shifted quantization, and the method 400 moves to block 416, where quantization is performed, as discussed below. In the case where the small detail analysis component 310 determines that the variance is greater than or equal to T, the method 400 moves to Block 410.

In blocks 410-412, the small detail analysis component 310 makes a further determination as to whether a loss of small detail will result from quantization of the pixels of the selected portion of the video frame. In block 410, the maximum and minimum values, $S_{min}$ and $S_{max}$, of the selected color component of the pixels is determined. As illustrated in FIG. 6A, $S_{min}$ and $S_{max}$ represent the outermost extents of the histogram, S.

In block 412, the difference between the values of $S_{min}$ and $S_{max}$ after quantization, denoted $Q(S_{min})$ and $Q(S_{max})$, are examined by the small detail analysis component 310. In an embodiment, quantization may be performed by removing at least one bit from the video frame, thereby reducing the number of bits representing the video frame. For example, an 8-bit Y signal may be quantized to a 4-bit Y signal by dividing the Y value of each pixel by 16 (e.g., $2^4$, where 4 is the number of bits that are being discarded). In alternative embodiments, quantization may be performed by other methods without departing from the scope of the disclosed embodiments.

If the maximum and minimum quantized color values of the pixels, $Q(S_{min})$ and $Q(S_{max})$, lie within different quantization levels, then the difference between $Q(S_{min})$ and $Q(S_{max})$ is non-zero. The implication of this result is that quantized histogram, Q(S), of luminance pixel values for the selected area of the frame is represented by at least two different luminance values as illustrated in FIG. 6B.

Finding a non-zero difference between $Q(S_{min})$ and $Q(S_{max})$, the small detail analysis component 310 determines that at least a portion of the small detail within the selected portion of the video frame may be preserved after quantization, without the need for color-shifting prior to quantization. In this case, the method moves to block 416, where quantization is performed.

However, if the maximum and minimum quantized color values of the pixels, $Q(S_{min})$ and $Q(S_{max})$, lie within the same quantization level, as illustrated in FIG. 6C, then the difference between $Q(S_{min})$ and $Q(S_{max})$ is zero. The implication of this result is that the quantized histogram, Q(S), for the selected area of the frame is represented by only one luminance value. As a result, the small detail analysis component 310 determines that small detail within the selected portion of the video frame may not preserved during quantization. In this case, the method 400 moves to block 502 of method 500 (FIG. 5), where color-shifting and quantization is performed.

FIG. 5 is a flow diagram illustrating an embodiment of a method 500 of performing color-shifted quantization. In certain embodiments, one or more of the operations of the method 500 may be performed by the color-shifting and quantization component 312. In alternative embodiments, other components of the video system may perform one or more of the operations of the method 500, alone or in conjunction with the color-shifting and quantization component 312. In block 502, the mean color value of the pixels, $S_{avg}$, is calculated.

In block 504, the nearest quantization threshold to $S_{avg}$, denoted $QT(S_{avg})$, is determined (FIG. 6D). The quantization threshold can be understood as the color component value closest to $S_{avg}$ which, when quantized, represents the boundary between one quantization level and another. In block 506, a difference, d, between $S_{avg}$ and $Q(S_{avg})$ is calculated. In one embodiment, $d=S_{avg}-QT(S_{avg})$.

The difference, d, is applied to each pixel within the selected portion of the video frame in block 510. As a result, the histogram, S, changes position, becoming color-shifted histogram, S', where S'=S–d. As illustrated in FIG. 6E, by shifting each pixel in histogram S by d, yielding histogram S', $S_{avg}$ is made to approximately line up with $QT(S_{avg})$. As a result, when quantization is performed in block 512, the quantized, color-shifted histogram, Q(S'), extends between two quantization levels (FIG. 6F) and the quantized, color-shifted histogram Q(S') for the selected area of the frame is represented by at least two different luminance values, preserving small detail after quantization.

In alternative embodiments, d may be calculated as $d=QT(S_{avg})-S_{avg}$. In this case, S' is given by S'=S+d.

Subsequently, motion estimation may be performed upon quantized, color-shifted video frames. Because small detail is preserved within the video frames, the ability of motion estimation procedures to correctly identify the motion vectors of moving objects and to generate interpolated frames is greatly improved, reducing motion estimation artifacts and enhancing the quality of the resultant video display.

EXAMPLE

An example of the color-shifted quantization procedure is discussed in detail below, employing luminance. The as-received and quantized luminance values, Y, are assumed to be 8-bit and 4 bit, respectively. It is further assumed that the luminance histogram satisfies the condition that variance is greater than or equal to a selected threshold.

FIG. 7A illustrates a selected portion of a video frame, where luminance values have been assigned to pixels within the frame. As will be shown below, when performing quantization, without color-shifting, the pixels of the selected portion of the video frame may be assigned the same quantized luminance value, losing the small detail within the pixels. Performing an embodiment of the color-shifted quantization procedure disclosed herein, however, the quantized color values are not all equal, preserving small detail after quantization. It may be understood that these examples are discussed for illustrative purposes and should not be construed to limit the scope of the disclosed embodiments.

Examining the luminance values of pixels within a selected portion of a video frame, FIG. 7A, the method 400 discussed above with respect to FIG. 4 is performed to determine whether small detail is present within the selected portion of the video frame and whether quantization will result in loss of small detail. As discussed above, it is assumed that that the variance of the luminance of the pixels within the selected portion of the video frame is greater than or equal to the threshold and, thus, small detail is present.

To determine whether quantization of the will result in loss of small detail, the values of $S_{min}$ and $S_{max}$ for the pixels within the selected portion of the video frame are identified and the difference between the quantized values of $S_{min}$ and $S_{max}$, $Q(S_{min})$ and $Q(S_{max})$ are calculated. Non-zero differences $Q(S_{min})$ and $Q(S_{max})$ are taken to indicate that small detail is not lost by quantization, while differences $Q(S_{min})$ and $Q(S_{max})$ equal to zero are taken to indicate that small detail will be lost by quantization.

From FIGS. 7A, it may be seen that the values of $S_{min}$ and $S_{max}$ are:

$S_{min}=32$ $S_{max}=39$

Further, as the as-received and quantized luminance values are assumed to be 8-bit and 4-bit, respectively, the quantized luminance values may be calculated as the integer resulting from dividing the as-received luminance values by $2^4=16$:

$$Q(S_{min})=\text{Int}(32/16)=2$$

$$Q(S_{max})=\text{Int}(39/16)=2$$

$$Q(S_{min})-Q(S_{max})=2-2=0$$

As illustrated in FIGS. 7B, this analysis reveals that quantization will result in a loss of small detail, as all pixels exhibiting uniform luminance values of 2.

Having determined that color-shifted quantization is needed to preserve small detail, the selected portion of the video frame is further analyzed using the method 500 of FIG. 5 to determine the amount by which the pixels should be color-shifted in luminance order to preserve small detail after quantization. In the method 500, the mean luminance $S_{avg}$, the quantization threshold $QT(S_{avg})$, and, the difference $d=S_{avg}-QT(S_{avg})$ are calculated. From FIG. 7A, it may be seen that these parameters are:

$$S_{avg}=36$$

$$QT(S_{avg})=QT(36)=32$$

$$d=S_{avg}-QT(S_{avg})=32-36=-4$$

The implication of these calculations is that the luminance values pixels should be shifted by −4 units to obtain histogram S'.

The results of this luminance shift, before and after quantization, are illustrated in FIGS. 7C-7D. In FIG. 7D, it may be observed that the color-shifted quantization values range between 1 and 2. This is in contrast to the quantized values of FIG. 7B, which are not subjected to color-shifting prior to quantization, and where quantized luminance values of only 2 were obtained. Thus, it may be observed that the color-shifting allows for the preservation of small detail during quantization, improving the quality of quantized images and further enabling enhanced quality in motion compensation.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A computer-implemented method of video processing, the method comprising:
    making a first determination whether small details are present within a selected portion of a video frame, wherein the video frame comprises a plurality of pixels having one or more color components;
    making a second determination whether quantization of the selected portion of the video frame will result in the loss of the small details;
    shifting values of at least a selected color component of the pixels in the selected portion by a selected amount when small details are determined to be present in the selected portion and the quantization of the selected portion is determined to result in the loss of the small details for preserving small details in the video frame includes:
        calculating a mean value of the selected color component, $S_{avg}$,
        identifying a quantization threshold, $QT(S_{avg})$, representing the value of the selected color component nearest to $S_{avg}$ and representing a boundary between one quantization level and another,
        calculating the selected amount as equal to the difference between $QT(S_{avg})$ and $S_{avg}$; and
    quantizing the video frame with the values of the selected color component of the pixels present within at least two quantization levels for displaying the video on a display.

2. The computer-implemented method of claim 1, wherein the color components comprise at least one of luminance (Y), chrominance (U), chrominance (V), red (R), green (G), and blue (B), and combinations thereof.

3. The computer-implemented method of claim 1, wherein making the first determination comprises:
    calculating a variance of the selected color component of the pixels; and comparing the variance to a selected threshold value;
    wherein small details are determined to be present in the selected portion of the video frame when the variance is greater than or equal to the selected threshold value.

4. The computer-implemented method of claim 1, wherein making the second determination comprises:
    identifying a minimum value, $S_{min}$, and maximum value, $S_{max}$, of the selected color component of the pixels; and
    calculating a difference between quantized values of the minimum and maximum values, $Q(S_{min})$ and $Q(S_{max})$;
    wherein small details are determined to be lost by quantization when the difference between $Q(S_{min})$ and $Q(S_{max})$ is zero.

5. The computer implemented method of claim 1, wherein quantization comprises removing at least one bit from the video frame.

6. A content adaptive quantization system for video processing, the system comprising:
    a small detail analysis component for detecting the presence of small details within a selected portion of a video frame;
    wherein the video frame is represented by a plurality of pixels having one or more color components;
    a shifting component for shifting the values of at least one selected color component by a selected amount when small details are detected to be present in the selected portion and for preserving at least a portion of the small detail within the quantized video frame includes:
        calculating a mean value of the selected color component, $S_{avg}$,
        identifying a quantization threshold, $QT(S_{avg})$, representing the value of the selected color component nearest to $S_{avg}$ and representing a boundary between one quantization level and another, and
        calculating the selected amount as a distance d given by:

$$d=QT(S_{avg})-S_{avg} \text{ or}$$

$$d=S_{avg}-QT(S_{avg}); \text{ and}$$

a quantizing component for quantizing the selected portion of the video frame, with values of a selected color component of the shifted pixels reside within at least two adjacent quantization levels for displaying the video frame on a display.

7. The content adaptive quantization system of claim 6, wherein the color components comprise luminance (Y), chrominance (U), chrominance (V), red (R), green (G), and blue (B), and combinations thereof.

8. The content adaptive quantization system of claim 6, wherein the small detail analysis component is operative to:

calculate a variance of the selected color component of the pixels; and compare the variance to a selected threshold value;

wherein small details are determined to be present in the selected portion of the video frame when the variance is greater than or equal to the threshold value.

9. The content adaptive quantization system of claim 6, wherein the small detail analysis component is operative to:

identify a minimum value, $S_{min}$, and maximum value, $S_{max}$, of the selected color component of the pixels; and calculate the difference between the quantized values of the minimum and maximum values, $Q(S_{min})$ and $Q(S_{max})$;

wherein small details are determined to be lost by quantization when the difference between $Q(S_{min})$ and $Q(S_{max})$ is zero.

10. The computer implemented method of claim 6, wherein quantization comprises reducing the bit number of the video frame.

11. A video processing system, comprising:

a video compression component configured to receive a video signal representing at least one video frame;

the video compression component operative to:

identify the presence of small details within a selected portion of a video frame;

analyze the selected portion of the video frame to determine whether quantization of the selected portion of the video frame will result in the loss of the small details;

shift values of at least one color component of a plurality of pixels representing the video signal by a selected amount when small details are identified to be present in the selected portion and the quantization of the selected portion is determined to result in the loss of the small details for preserving small detail within the selected portion of the video frame includes:

calculating a mean value of the selected color component, $S_{avg}$, identifying a quantization threshold, $QT(S_{avg})$, representing the value of the selected color component nearest to $S_{avg}$ and representing a boundary between one quantization level and another, and calculating the selected amount as equal to the difference between $QT(S_{avg})$ and $S_{avg}$;

quantize the selected portion with the values of a selected color component of the pixels present within at least two quantization levels for displaying on a display; and a motion estimation component configured to receive a quantized video signal comprising the shifted, quantized pixels from the video compression component so as to perform motion estimation upon motion objects within the video frame.

12. The video processing system of claim 11, wherein the video frames contained within the video signal are uncompressed.

13. The video processing system of claim 11, wherein the at least one color component comprises at least one of luminance (Y), chrominance (U), chrominance (V), red (R), green (G), and blue (B), and combinations thereof.

14. The video processing system of claim 11, wherein identifying the presence of small details within at least a portion of the video frame comprises:

calculating a variance of the selected color component of the pixels; and comparing the variance to a selected threshold value;

wherein small details are determined to be present in the selected portion of the video frame when the variance is greater than or equal to the selected threshold value.

15. The video processing system of claim 11, wherein determining whether quantization of the selected portion of the video frame will result in the loss of the small details comprises:

identifying a minimum value, $S_{min}$, and maximum value, $S_{max}$, of the selected color component of the pixels; and calculating a difference between quantized values of the minimum and maximum values, $Q(S_{min})$ and $Q(S_{max})$;

wherein small details are determined to be lost by quantization when the difference between $Q(S_{min})$ and $Q(S_{max})$ is zero.

16. The video processing system of claim 11, wherein quantization comprises removing at least one bit from the video signal.

* * * * *